United States Patent
Yi et al.

(10) Patent No.: US 11,363,624 B2
(45) Date of Patent: Jun. 14, 2022

(54) METHOD FOR RECEIVING DL DATA ON SPS RESOURCES IN WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR); Gyeongcheol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 16/635,995

(22) PCT Filed: Sep. 21, 2018

(86) PCT No.: PCT/KR2018/011279
§ 371 (c)(1),
(2) Date: Jan. 31, 2020

(87) PCT Pub. No.: WO2019/066418
PCT Pub. Date: Apr. 4, 2019

(65) Prior Publication Data
US 2021/0153236 A1 May 20, 2021

Related U.S. Application Data

(60) Provisional application No. 62/564,271, filed on Sep. 28, 2017.

(51) Int. Cl.
*H04W 72/12* (2009.01)
*H04W 76/27* (2018.01)
*H04W 68/02* (2009.01)
*H04W 72/04* (2009.01)

(52) U.S. Cl.
CPC ....... *H04W 72/1289* (2013.01); *H04W 68/02* (2013.01); *H04W 72/042* (2013.01); *H04W 76/27* (2018.02)

(58) Field of Classification Search
CPC . H04W 72/1289; H04W 76/27; H04W 68/02; H04W 72/042; H04W 72/14;
(Continued)

(56) References Cited

U.S. PATENT DOCUMENTS

| 7,756,081 B2* | 7/2010 | Park ...................... H04L 5/0053 370/329 |
| 2010/0208667 A1* | 8/2010 | Chun ................ H04W 72/1289 370/329 |

(Continued)

OTHER PUBLICATIONS

PCT International Application No. PCT/KR2018/011279, Notification of Transmittal of the International Search Report and the Written Opinion of the International Searching Authority, or Declaration dated Jan. 10, 2019, 10 pages.

(Continued)

*Primary Examiner* — Mewale A Ambaye
(74) *Attorney, Agent, or Firm* — Lee, Hong, Degerman, Kang & Waimey PC

(57) ABSTRACT

The present invention relates to a wireless communication system. More specifically, the present invention relates to a method and a device for receiving DL data on SPS resources in wireless communication system, the device receives downlink (DL) Semi-Persistent Scheduling (SPS) configuration information, receives a paging message including an identifier related to the UE, and configures DL SPS resources based on the received DL SPS configuration information based on the paging message including information for activating of DL SPS configuration, wherein the UE receives DL data on each of the configured DL SPS resource.

14 Claims, 12 Drawing Sheets

(58) Field of Classification Search
CPC ..... H04W 72/12; H04W 76/10; H04W 76/30; H04W 68/00; H04W 52/48
See application file for complete search history.

(56) References Cited

U.S. PATENT DOCUMENTS

| | | | | |
|---|---|---|---|---|
| 2011/0083066 | A1* | 4/2011 | Chung | H03M 13/09 |
| | | | | 714/807 |
| 2014/0086112 | A1* | 3/2014 | Stern-Berkowitz | ............ |
| | | | | H04L 1/1854 |
| | | | | 370/280 |
| 2018/0279274 | A1* | 9/2018 | Sun | H04L 1/1864 |
| 2018/0302886 | A1* | 10/2018 | Pan | H04W 72/0406 |
| 2019/0075550 | A1* | 3/2019 | Lee | H04W 72/14 |
| 2019/0208436 | A1* | 7/2019 | Zhou | H04L 1/0027 |
| 2019/0297636 | A1* | 9/2019 | Gupta | H04W 72/042 |

OTHER PUBLICATIONS

Intel, "Semi-persistent scheduling for feNB0-IoT", 3GPP TSG RAN WG1 Meeting #90, R1-1712503, Aug. 2017, 5 pages.
Samsung, "New SPS mechanism for power saving", 3GPP TSG RAN WG1 Meeting #90, R1-1713546, Aug. 2017, 4 pages.
Huawei, et al., "NR Standalone Operation on unlicensed Bands", 3GPP TSG RAN WG1 Meeting #90, R1-1713786, Aug. 2017, 4 pages.
Intel, "Support of semi-persistent scheduling for feNB-IoT", 3GPP TSG RAN WG1 Meeting #89, R1-1707321, May 2017, 5 pages.

* cited by examiner

[Figure 1]
--PRIOR ART--
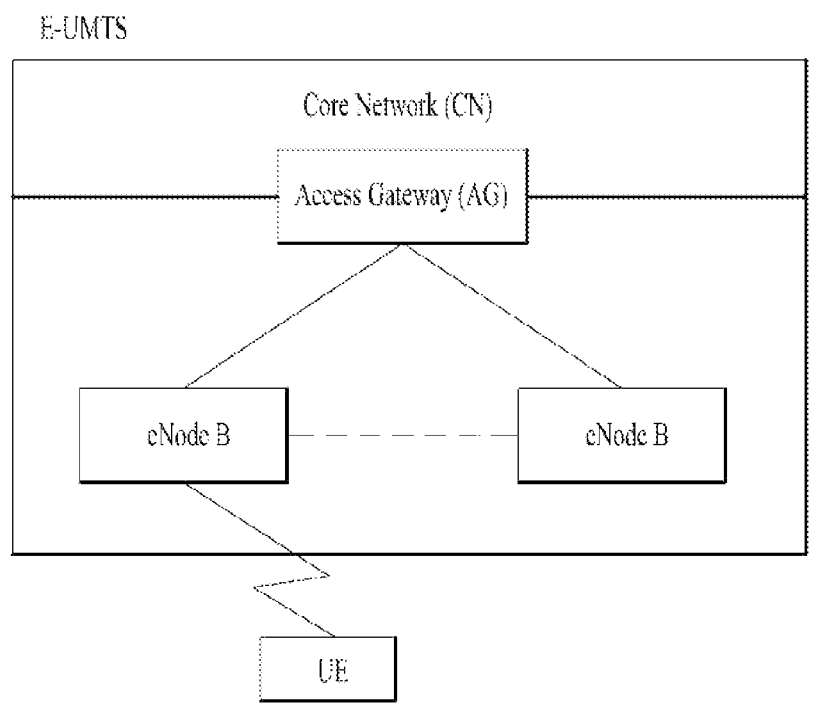

[Figure 2a]
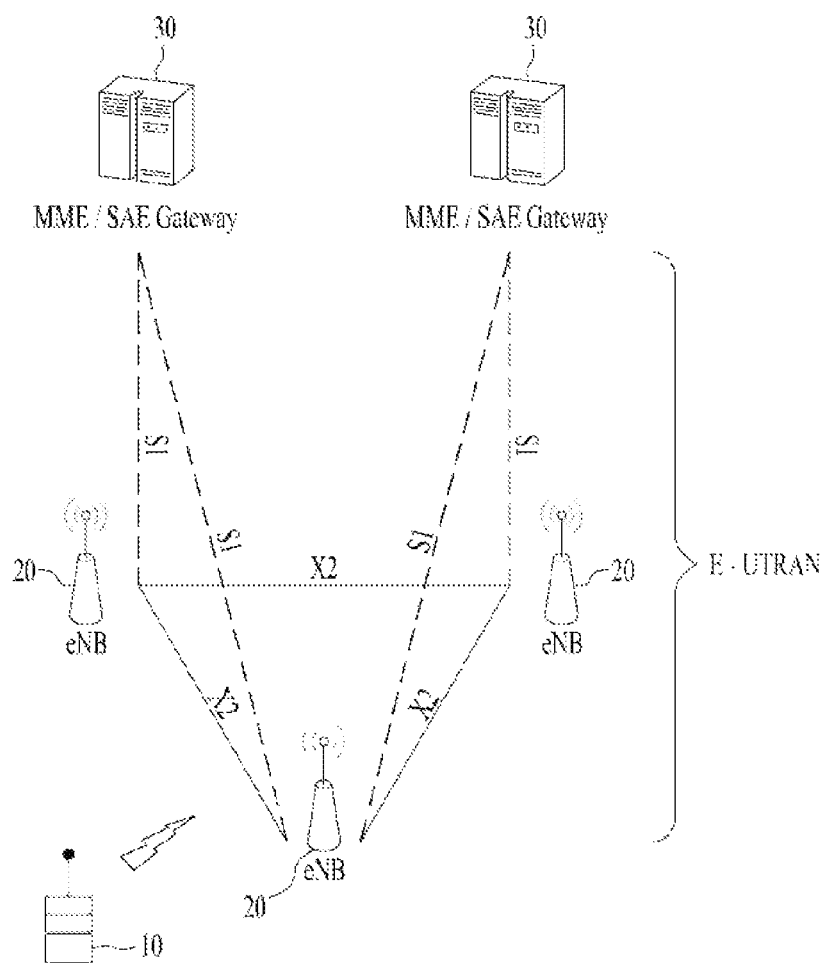

【Figure 2b】
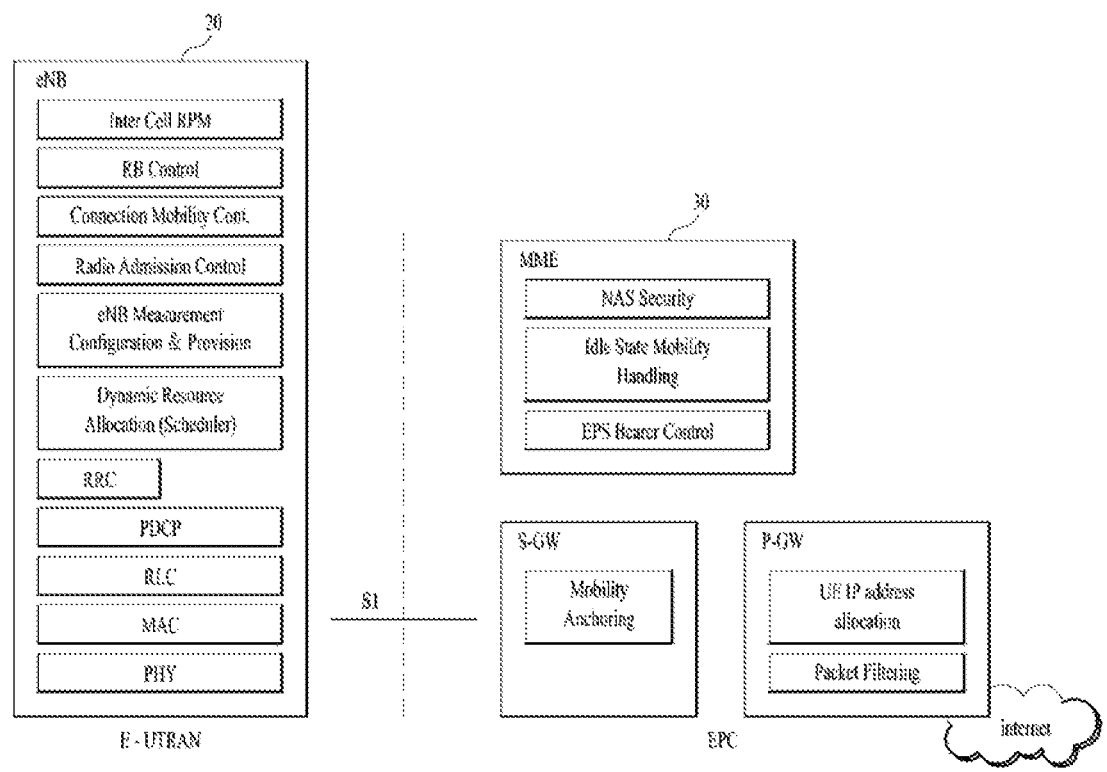

【Figure 3】
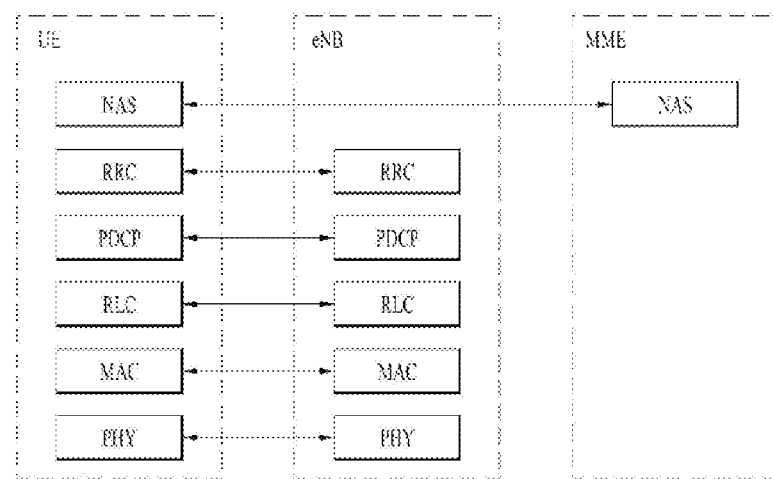
( a ) Control-Plane Protocol Stack
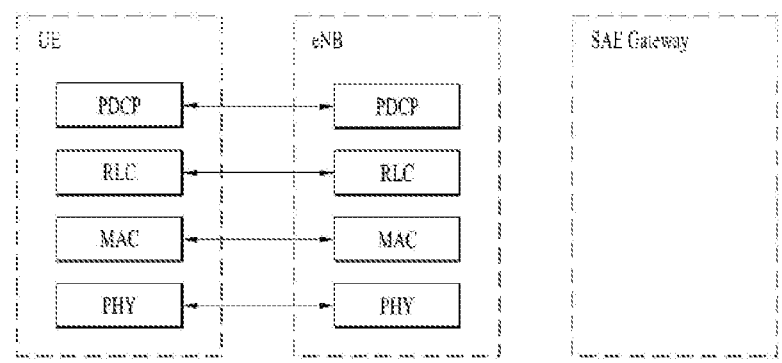
( b ) User-Plane Protocol Stack 【Figure 4a】
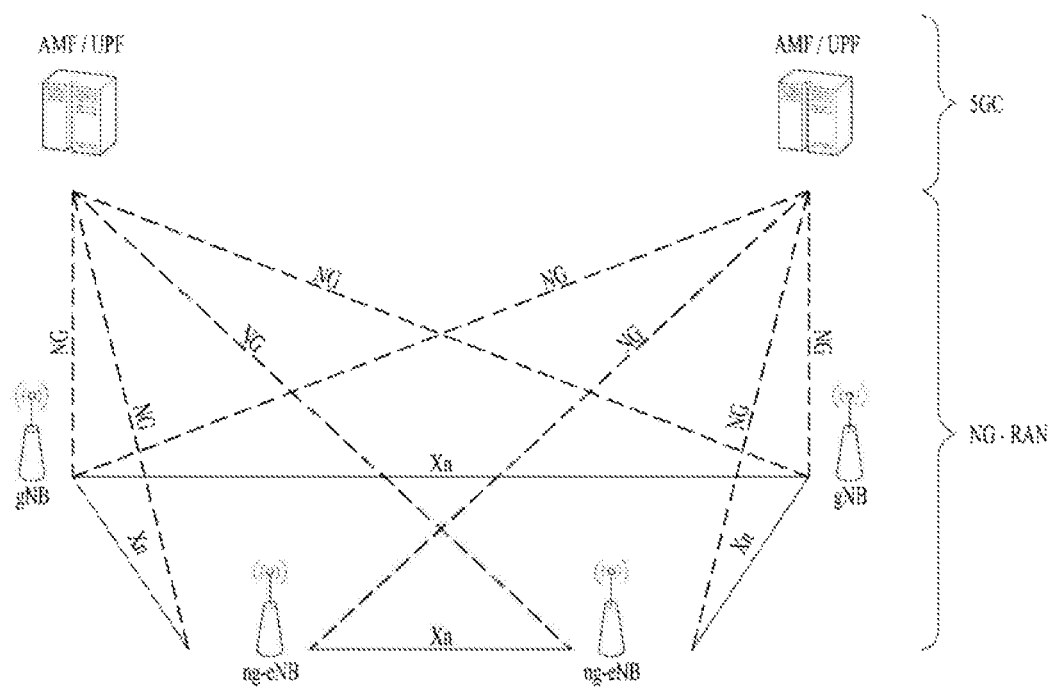

【Figure 4b】
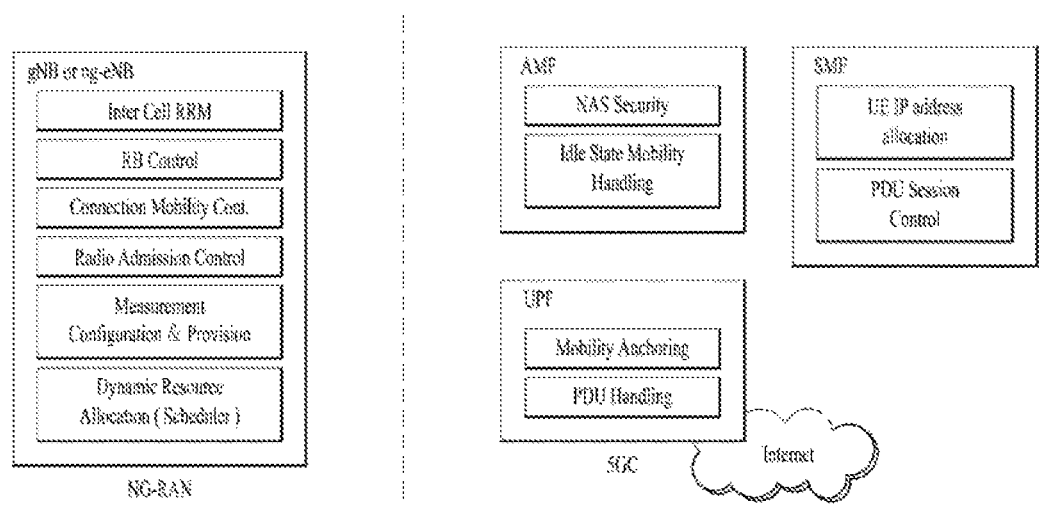

【Figure 5】
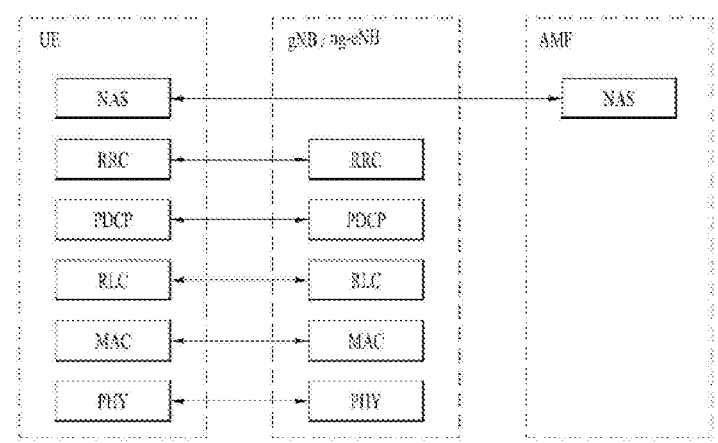
(a) Control-Plane Protocol Stack
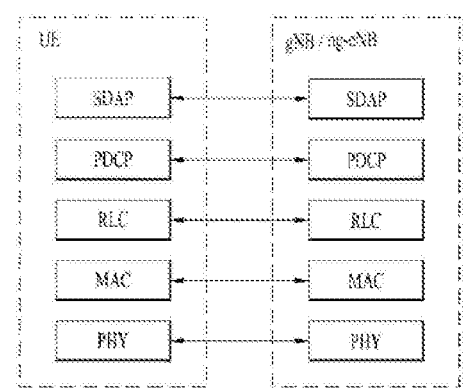
(b) User-Plane Protocol Stack 【Figure 6】
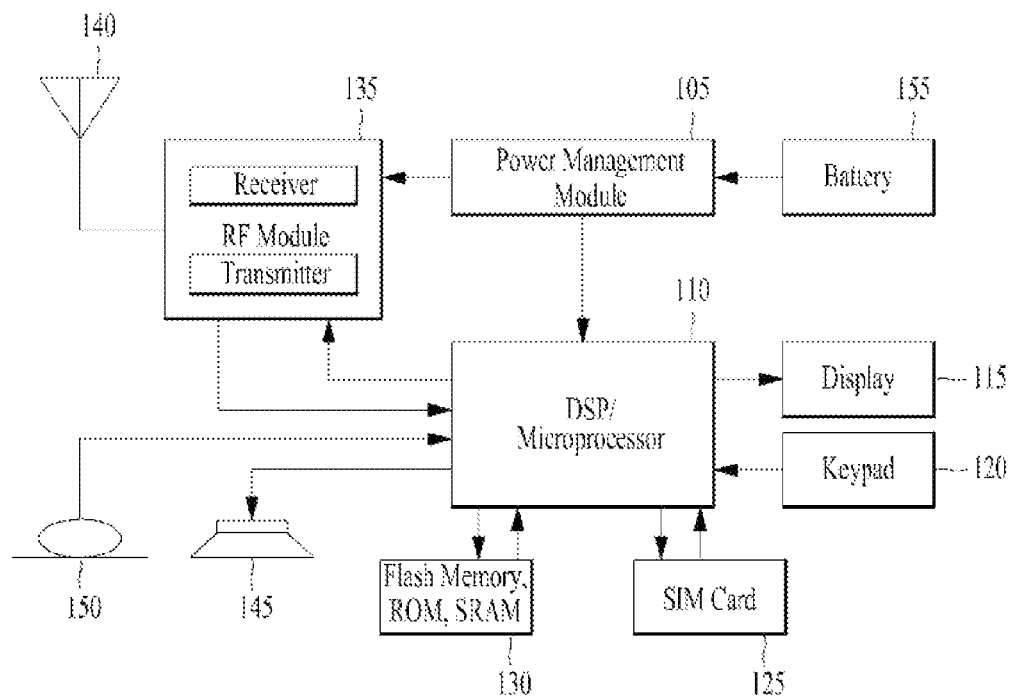

【Figure 7】
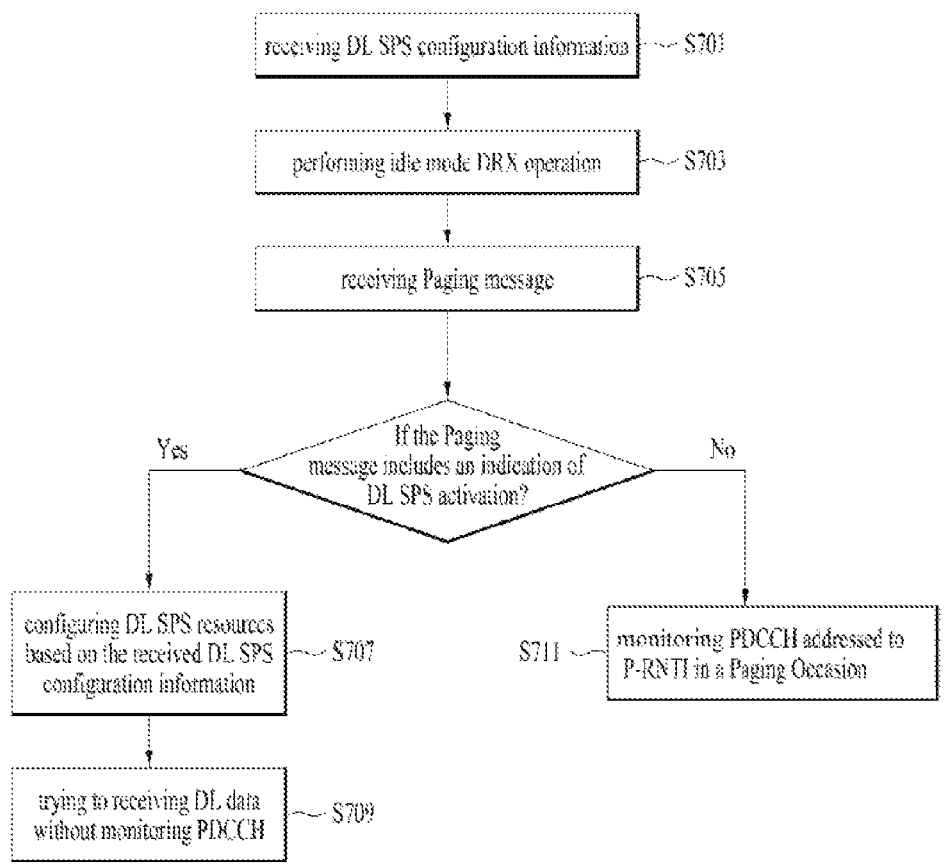

【Figure 8】
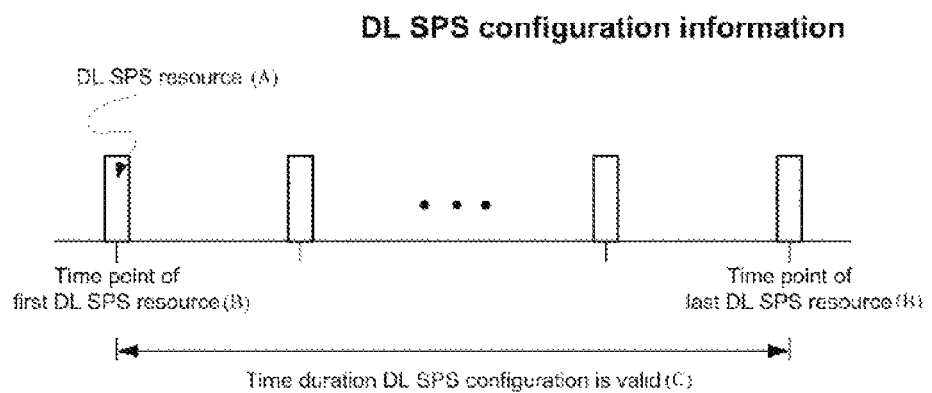

[Figure 9]
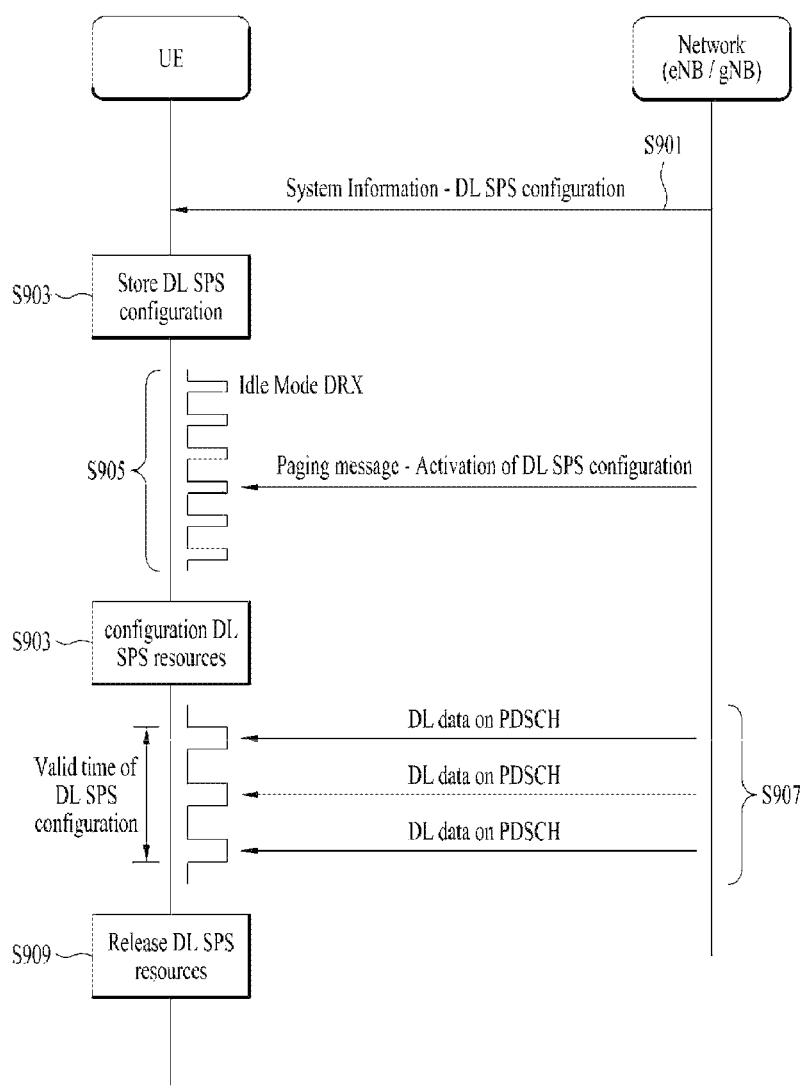

【Figure 10】
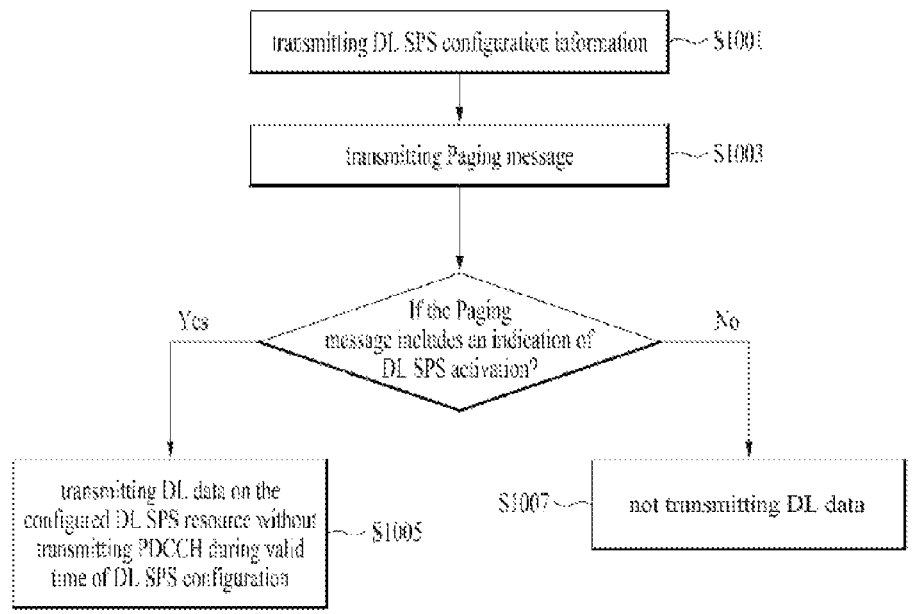

METHOD FOR RECEIVING DL DATA ON SPS RESOURCES IN WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2018/011279, filed on Sep. 21, 2018, which claims the benefit of U.S. Provisional Application No. 62/564,271, filed on Sep. 28, 2017, the contents of which are all hereby incorporated by reference herein in their entirety.

TECHNICAL FIELD

The present invention relates to a wireless communication system and, more particularly, to a method for receiving DL data on SPS resources in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for receiving DL data on SPS resources in wireless communication system.

The NB-IoT should consider using a shared downlink channel necessary for large file transfer such as software or firmware update. In this use case, shared downlink channels, e.g., MBMS or SC-PTM, would be useful to transmit same update data to all UEs, which are involved in firmware update. To use the shared downlink channel for large file transfer, a new approach is needed to enhance power consumption.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, a NarrowBand Internet of Things (NB-IoT) UE is able to receive quite amount of DL data in RRC_IDLE for power saving.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2a is a block diagram illustrating network structure of an evolved universal mobile telecommunication system (E-UMTS), and FIG. 2b is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4a is a block diagram illustrating network structure of NG Radio Access Network (NG-RAN) architecture, and FIG. 4b is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIG. 6 is a block diagram of a communication apparatus according to an embodiment of the present invention;

FIG. 7 is a conceptual diagram for receiving DL data on SPS resources in wireless communication system according to embodiments of the present invention;

FIG. 8 is an example of DL SPS configuration information;

FIG. 9 is an example for receiving DL data on SPS resources in wireless communication system according to embodiments of the present invention; and FIG. 10 is a conceptual diagram for transmitting DL data on SPS resources in wireless communication system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2b is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 7 is a conceptual diagram for receiving DL data on SPS resources in wireless communication system according to embodiments of the present invention.

This embodiment describes from a user equipment perspective.

In NB-IoT, one of requirement is that the NB-IoT UE is able to receive quite amount of DL data in RRC_IDLE for power saving. Typical example is firmware update of the NB-IoT UE. For the NB-IoT UE in RRC_IDLE to receive quite amount of data in power efficient and less signalling overhead manner, a new mechanism needs to be introduced.

For this, our invention is that the UE receives DL SPS configuration information in advance, and the UE receives PDSCH on each DL SPS resource configured by the DL SPS configuration information when the UE receives Paging message including information for activating the DL SPS configuration.

More specifically, the UE receives DL SPS configuration information from a network (S701).

Preferably, the DL SPS configuration information includes one or more of followings: i) DL SPS physical resource (A), or ii) time point each DL SPS resource is configured (B), or iii) time duration DL SPS configuration is valid (C), as shown FIG. 8.

The time point each DL SPS resource is configured can be time point of first DL SPS resource, or time interval between two adjacent DL SPS resources.

Preferably, the DL SPS configuration information is received via System Information, or dedicated RRC message when the UE is in RRC_CONNECTED.

After receiving DL SPS configuration information, the UE performs idle mode DRX operation and monitors PDCCH addressed to P-RNTI in the Paging Occasion (S703).

Preferably, the Paging Occasion is determined by UE ID. The UE ID may be shared by multiple UEs. In this case, the UE ID can be paging group ID.

When the UE receives PDCCH addressed to P-RNTI in a Paging Occasion, the UE decodes PDSCH associated with the PDCCH to receive Paging message (S705).

The PDSCH is transmitted either in the same subframe as the PDCCH, or in the different subframe than PDCCH.

Preferably, the Paging message is transmitted on the PDSCH.

If the UE receives information for activating of DL SPS configuration in the Paging message, the UE configures DL SPS resources based on the received DL SPS configuration information (S707), and the UE tries to receive DL data by decoding PDSCH on each of the configured DL SPS resource (S709).

Preferably, the information for activating of DL SPS configuration in the Paging message can be an indicator using paging cause. In the case, the paging cause represents DL SPS activation.

Preferably, the paging message further includes time point of deactivation of DL SPS configuration. So, the UE can release the DL SPS resources at time point of deactivation of DL SPS configuration.

Preferably, when the UE tries to receive DL data by decoding PDSCH on each of the configured DL SPS resources, the UE does not need to monitor PDCCH to receive PDSCH on each of the configured DL SPS resources.

If the Paging message doesn't include the information for activating of DL SPS configuration in the Paging message, the UE keeps monitoring PDCCH addressed to P-RNTI in a Paging Occasion (S711)

Further, the UE release the DL SPS resources when the time duration DL SPS configuration is valid is ended, or an explicit command to release DL SPS resource is received on the PDSCH.

Preferably, the invention may be applied to NB-IoT UE. Above all, the invention may be applied to UE in RRC_IDLE.

In fact, the NB IoT should consider using a shared downlink channel necessary for large file transfer such as software or firmware update. In this use case, shared downlink channels, e.g., MBMS or SC-PTM, would be useful to transmit same update data to all UEs, which are involved in firmware update. To use the shared downlink channel for large file transfer, there are two approaches to enhance power consumption.

The first option is DRX approach. In this option, the UE wakes up at the Active Time, e.g., on duration, and monitors PDCCH to check if there is a scheduled DL transmission. If PDCCH indicates scheduled DL transmission, then the UE receives DL transmission on the indicated PDSCH. However, if Active Time is well aligned with DL data transmission by proper DRX pattern, PDCCH monitoring may be wasteful and unnecessary because every PDCCH will indicates DL transmission and carry the similar/same scheduling information for scheduled DL transmission.

The second option is SPS approach, such as this present invention. In this approach, if the proper SPS pattern is configured for large file transfer, the UE wakes up at the configured SPS resource and receives downlink update data on the PDSCH without monitoring PDCCH. Thus, using SPS with shared downlink channel seems better than DRX with shared downlink channel in terms of power saving.

Given that the NB-IoT UE will stay in RRC_IDLE for power saving, the NB-IoT UE would receive paging message for DL file transfer. In this case, it would be beneficial in terms of signaling overhead to activate the SPS resource when the UE receives paging. For this purpose, paging message with cause value of SPS activation could be used. In addition, as multiple UEs will receive the DL file via shared DL SPS resource, group paging ID with cause value of SPS activation, which activates SPS of multiple UEs simultaneously, would be used.

Preferably, the DL SPS resources are shared resource. The shared DL resource is SPS resource or more than one UE can be allocated with the same resource.

The proposed method is implemented by a user equipment (UE), shown in FIG. 6, but it can be any apparatus for performing the same operation.

As shown in FIG. 6, the UE may comprises a DSP/microprocessor (110) and RF module (transceiver; 135). The DSP/microprocessor (110) is electrically connected with the transceiver (135) and controls it.

Specifically, FIG. 6 may represent a UE comprising a receiver (135) configured to receive downlink (DL) Semi-Persistent Scheduling (SPS) configuration information from the network, and receive a paging message including an identifier related to the UE from the network, and a processor (110) configured to configure DL SPS resources based on the received DL SPS configuration information if the paging message includes information for activating of DL SPS configuration. Wherein the receiver tries to receive DL data on each of the configured DL SPS resource.

FIG. 9 is an example for receiving DL data on SPS resources in wireless communication system according to embodiments of the present invention.

The UE receives DL SPS configuration information via system information from a Network (S901).

When the UE receives DL SPS configuration information, the UE store the information but doesn't configure it immediately (S903).

And when the UE receives paging message after a while, the UE configures DL SPS resources based on the received DL SPS configuration information (S905).

After configuring the configures DL SPS resources, the UE tries to receive DL data on each of the configured DL SPS resource without monitoring PDCCH during valid time of DL SPS configuration (S907).

After the valid time of DL SPS configuration is passed, the UE releases the DL SPS configuration (S909).

FIG. 10 is a conceptual diagram for transmitting DL data on SPS resources in wireless communication system according to embodiments of the present invention.

This embodiment describes from a base station perspective.

The network transmits DL SPS configuration information to a UE (S1001).

Preferably, the UE is a NB-IoT UE. Above all, the invention may be applied to UE in RRC_IDLE.

Anyway, preferably, the DL SPS configuration information includes one or more of followings: i) DL SPS physical resource (A), or ii) time point each DL SPS resource is configured (B), or iii) time duration DL SPS configuration is valid (C), as shown FIG. 8.

The time point each DL SPS resource is configured can be time point of first DL SPS resource, or time interval between two adjacent DL SPS resources.

Preferably, the DL SPS configuration information is transmitted via System Information, or dedicated RRC message when the UE is in RRC_CONNECTED.

After transmitting DL SPS configuration information, the network transmits PDCCH addressed to P-RNTI in a Paging Occasion to transmit a Paging message (S1003).

Preferably, the Paging Occasion is determined by UE ID. The UE ID may be shared by multiple UEs.

And the network transmits the Paging message on the PDSCH. The PDSCH is transmitted either in the same subframe as the PDCCH, or in the different subframe than PDCCH.

If the Paging message includes the information for activating of DL SPS configuration, the UE configures DL SPS resources based on the received DL SPS configuration information. So, the network transmit DL data on the configured DL SPS resource without transmitting PDCCH during valid time of DL SPS configuration (S1005).

Preferably, the information for activating of DL SPS configuration in the Paging message can be Paging cause. In the case, the Paging cause represents DL SPS activation.

Preferably, the Paging message further includes time point of deactivation of DL SPS configuration.

Further, when the network wants the UE to release the DL SPS resources, the network transmits valid time duration of the DL SPS resources in the Paging message, or explicit command to release DL SPS resource is received on the PDSCH.

If the Paging message doesn't include the information for activating of DL SPS configuration, the network keeps doesn't transmit DL data (S1007).

The proposed method is implemented by a network apparatus, shown in FIG. 6, but it can be any apparatus for performing the same operation.

As shown in FIG. 6, the network apparatus may comprises a DSP/microprocessor (110) and RF module (transceiver; 135). The DSP/microprocessor (110) is electrically connected with the transceiver (135) and controls it.

Also, FIG. 6 may represent the network apparatus comprising a receiver (135), and a transmitter (135). These transmitter and receiver may constitute the transceiver (135). The network further comprises a processor (110) operably coupled with the transmitter and the receiver (135: receiver and transmitter). The transmitter (110) is configured to transmit DL SPS configuration information to a UE, and transmit PDCCH addressed to P-RNTI in a Paging Occasion to transmit a Paging message.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory, unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a User Equipment (UE) operating in a wireless communication system, the method comprising:
receiving downlink (DL) Semi-Persistent Scheduling (SPS) configuration information;
receiving a paging message including an identifier related to the UE; and
configuring DL SPS resources based on the received DL SPS configuration information based on the paging message including information for activating of DL SPS configuration,
receive DL data on each of the configured DL SPS resources,
wherein the DL SPS configuration information is received via a system information, and wherein the UE releases the configured DL SPS resources based on a valid duration of the configured DL SPS resources being ended.

2. The method according to claim 1, wherein the UE does not monitor a Physical Downlink Control Channel (PDCCH) to receive the DL data on each of the configured DL SPS resources.

3. The method according to claim 1, wherein the DL SPS configuration information includes one or more followings:
   DL SPS physical resource;
   time information of first DL SPS resource;
   time interval between two adjacent DL SPS resources; or
   valid duration of configured DL SPS resources.

4. The method according to claim 1, further comprising:
   releasing the configured DL SPS resources based on explicit command to release DL SPS resource being received on the paging message.

5. The method according to claim 1, wherein the UE is Narrow Band-Internet of Things (NB-IoT) UE.

6. The method according to claim 1, wherein the paging message is received on Physical Downlink Shared Channel (PDSCH).

7. The method according to claim 1, wherein the UE is not in a Radio Resource Control (RRC) connected state, and the DL data is dedicated to the UE.

8. A user equipment (UE) operating in a wireless communication system, the UE comprising:
   a Radio Frequency (RF) module; and
   a processor configured to:
   receive, via the RF module, downlink (DL) Semi-Persistent Scheduling (SPS) configuration information;
   receive, via the RF module, a paging message including an identifier related to the UE;
   configure DL SPS resources based on the received DL SPS configuration information based on the paging message including information for activating of DL SPS configuration; and
   receive, via the RF module, DL data on each of the configured DL SPS resources,
   wherein the DL SPS configuration information is received via a system information, and
   wherein the processor releases the configured DL SPS resources based on a valid duration of the configured DL SPS resources being ended.

9. The UE according to claim 8, wherein the UE does not monitor a Physical Downlink Control Channel (PDCCH) to receive the DL data on each of the configured DL SPS resources.

10. The UE according to claim 8, wherein the DL SPS configuration information includes one or more followings:
    DL SPS physical resource;
    time information of first DL SPS resource;
    time interval between two adjacent DL SPS resources; or
    valid duration of configured DL SPS resources.

11. The UE according to claim 8, wherein the processor is further configured to:
    release the configured DL SPS resources based on explicit command to release DL SPS resource being received on the paging message.

12. The UE according to claim 8, wherein the UE is Narrow Band-Internet of Things (NB-IoT) UE.

13. The UE according to claim 8, wherein the paging message is received on Physical Downlink Shared Channel (PDSCH).

14. The UE according to claim 8, wherein the UE is not in a Radio Resource Control (RRC) connected state, and the DL data is dedicated to the UE.

* * * * *